(12) United States Patent
Gam

(10) Patent No.: US 9,193,878 B2
(45) Date of Patent: Nov. 24, 2015

(54) ANTICRATER AGENT FOR ELECTROCOATING COMPOSITION

(75) Inventor: Allisa Gam, Troy, MI (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 25 days.

(21) Appl. No.: 13/701,147

(22) PCT Filed: Jun. 7, 2011

(86) PCT No.: PCT/US2011/039371
§ 371 (c)(1),
(2), (4) Date: Nov. 30, 2012

(87) PCT Pub. No.: WO2011/156315
PCT Pub. Date: Dec. 15, 2011

(65) Prior Publication Data
US 2013/0090412 A1    Apr. 11, 2013

Related U.S. Application Data

(60) Provisional application No. 61/352,487, filed on Jun. 8, 2010, provisional application No. 61/352,486, filed on Jun. 8, 2010, provisional application No. 61/352,485, filed on Jun. 8, 2010.

(51) Int. Cl.
| | |
|---|---|
| *C08G 18/08* | (2006.01) |
| *C09D 5/44* | (2006.01) |
| *C08G 18/80* | (2006.01) |
| *C08G 18/42* | (2006.01) |
| *C08L 75/06* | (2006.01) |
| *C08G 18/58* | (2006.01) |
| *C08G 18/64* | (2006.01) |
| *C08G 18/76* | (2006.01) |
| *C08G 18/24* | (2006.01) |
| *C09D 175/06* | (2006.01) |
| *C09D 7/12* | (2006.01) |

(52) U.S. Cl.
CPC ............ *C09D 5/4465* (2013.01); *C08G 18/246* (2013.01); *C08G 18/4291* (2013.01); *C08G 18/581* (2013.01); *C08G 18/6407* (2013.01); *C08G 18/7664* (2013.01); *C08G 18/8029* (2013.01); *C08L 75/06* (2013.01); *C09D 5/4419* (2013.01); *C09D 7/125* (2013.01); *C09D 175/06* (2013.01)

(58) Field of Classification Search
CPC ............ C08G 18/2825; C08G 18/003; C08G 18/581; C08G 18/6407; C08G 18/7664; C08G 18/246; C08G 18/4291; C08G 18/8029; C09D 175/12; C09D 5/4465; C09D 7/125; C09D 5/4419; C09D 175/06; C08L 63/00; C08L 75/06
USPC .......... 523/413, 415; 524/589, 591, 839, 901, 524/875
See application file for complete search history.

(56) References Cited

U.S. PATENT DOCUMENTS

| | | | | |
|---|---|---|---|---|
| 5,639,828 | A * | 6/1997 | Briggs et al. .................. | 525/208 |
| 5,994,479 | A * | 11/1999 | Green et al. .................. | 525/481 |
| 6,846,400 | B2 * | 1/2005 | Klein et al. .................... | 204/499 |
| 2005/0187314 | A1 * | 8/2005 | Anderson et al. ............. | 523/415 |

* cited by examiner

*Primary Examiner* — Michael L Leonard
(74) *Attorney, Agent, or Firm* — Ingrassia Fisher & Lorenz, P.C.

(57) ABSTRACT

The present disclosure relates to an improved electrocoating coating composition wherein the improvement is the addition of a non-water reducible anticrater agent. The non-water reducible anticrater agent is a polyesterurethane that is the reaction product of an aliphatic carboxylic acid anhydride, a monofunctional epoxy compound, a monofunctional alcohol and a diisocyanate and/or a polyisocyanate. The improved electrocoating composition provides cured coatings that have fewer craters and have a smooth surface when compared to coatings utilizing other anticrater additives.

20 Claims, No Drawings

ANTICRATER AGENT FOR ELECTROCOATING COMPOSITION

CROSS-REFERENCE TO RELATED APPLICATION

This application is a U.S. National-Stage entry under 35 U.S.C. §371 based on International Application No. PCT/U.S.11/39371, filed Jun. 7, 2011, which was published under PCT Article 21(2) and which claims priority to U.S. Provisional Application NO. 61/352,487, filed Jun. 8, 20140, U.S. Provisional Application No. 61/352,485, filed Jun. 8, 2010, and to U.S. Provisional Application No. 61/352,486, filed Jun. 8, 2010, which are all hereby incorporated in their entirety by reference.

FIELD OF THE DISCLOSURE

The present disclosure is directed to an improved cathodic electrocoating composition and in particular to an improved cathodic electrocoating composition wherein the improvement is the incorporation of a non-water reducible anticrater agent, which significantly reduces craters and improves the smoothness of an electrocoated film of the composition.

BACKGROUND OF DISCLOSURE

The coating of electrically conductive substrates by an electrocoating process is a well-known and important industrial process. The electrocoating of primers to substrates is widely used in the automotive industry. In this process, a conductive article, such as an automobile body or an automobile part, is immersed in a bath comprising an aqueous emulsion of film forming polymer and acts as an electrode in the electrocoating process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Film forming polymer compositions used in the bath of a typical cathodic electrocoating process are well known in the art. These polymers are typically made from polyepoxides which have been chain extended using bisphenol compounds. The chain extended polyepoxides can then be reacted with amines to form an epoxy amine adduct. These polymers are blended with a crosslinking agent and then neutralized with an acid to form a water emulsion, which is usually referred to as a principal emulsion.

The principal emulsion can be combined with a pigment paste, coalescent solvents, water, and other additives to form the electrocoating composition. The composition is placed in an insulated tank containing the anode. The article to be coated is the cathode and is placed in a tank containing the electrocoating composition. An electrical current is applied to the system and a layer of the electrocoating composition is deposited onto the article. The thickness of the applied layer of electrocoating composition that is deposited on the article is a function of, for example, the bath characteristics, the electrical operating characteristics and the immersion time.

The resulting coated article is removed from the bath after a period of time and is rinsed with deionized water. The coating on the article can then be cured, typically in an oven, at sufficient temperature to produce a crosslinked finish on the article.

Cathodic electrocoating compositions, resin compositions, coating baths and cathodic processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

A continuing problem with cathodic electrocoating compositions has been the presence of craters in the cured finish. A number of anticrater agents have been used in the past to eliminate craters. However, the presence of conventional anticrater agents in electrocoating compositions has had a negative impact on the adhesion of subsequent coating layers applied thereto, such as automotive PVC sealers used for sealing joints and primer surfacers, particularly where the electrocoating film has been cured in an oven without the presence $NO_x$ (nitrogen oxides), such as in an indirect gas or electric oven. There is a continuing need for electrocoating compositions that can produce crater-free, smooth and even finishes that do not adversely affecting the adhesion of coatings that are subsequently applied to the electrocoated substrate.

STATEMENT OF THE DISCLOSURE

The present disclosure is directed to an improved cathodic electrocoating composition, comprising an aqueous emulsion having dispersed therein a crosslinkable component and a crosslinking agent; wherein the improvement is the incorporation of a non-water reducible anticrater agent comprising a polyesterurethane which is the reaction product of a monomer mixture consisting essentially of:
  (a) a cyclic aliphatic carboxylic acid anhydride;
  (b) a monofunctional epoxy compound;
  (c) a monofunctional alcohol; and
  (d) a diisocyanate, polyisocyanate or a combination thereof;
wherein the cyclic aliphatic carboxylic acid anhydride contains one or more side chains selected from the group consisting of an alkyl side chain having in the range of from 6 to 20 carbon atoms, an alkenyl side chain having in the range of from 6 to 20 carbon atoms and a combination thereof.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including every value between the minimum and maximum values.

As used herein:

The phrase "non-water reducible anticrater agent" means that the anticrater agent is free from ionic bonds that result from the neutralization of carboxylic acid groups using an amine or other base. In some embodiments, the non-water reducible anticrater agent has a solubility in water of less than 0.5 grams/liter. In further embodiments, the non-water reducible anticrater agent has a solubility in water of less than 0.1 grams/liter.

It has been found that the addition of the disclosed non-water reducible anticrater agent can improve the smoothness and reduce the amount of craters of a cured layer of electrocoat composition when compared to the same amount of a water reducible anticrater agents typically used in electrocoat compositions. In some embodiments, the non-water reducible anticrater agent is a polyesterurethane which is the reaction product of a monomer mixture consisting of or consisting essentially of:

(a) an aliphatic carboxylic acid anhydride;
(b) a monofunctional epoxy compound;
(c) a monofunctional alcohol; and
(d) a diisocyanate and/or higher polyisocyanate.

In some embodiments, the anticrater agent can be formed by 1) contacting an aliphatic carboxylic acid anhydride, a monofunctional epoxy and a monofunctional alcohol at a temperature in the range of from 50° C. to 250° C. to form a polyester polyol followed by the formation of the polyesterurethane by 2) contacting the polyester polyol with a diisocyanate, a polyisocyanate or a combination thereof at a temperature in the range of from 0° C. to 150° C.

An aliphatic carboxylic acid anhydride can be used to form the anticrater agent. In some embodiments, the aliphatic carboxylic acid anhydride can be a cyclic aliphatic carboxylic acid anhydride that is substituted by one or more alkyl side chains having in the range of from 6 to 20 carbon atoms, by one or more alkenyl side chains having in the range of from 6 to 20 carbon atoms, or by a combination thereof, wherein the side chain can be linear, branched, cyclic or a combination thereof. In some embodiments, the aliphatic carboxylic acid anhydride contains at least one of the alkyl side chains having in the range of from 8 to 18 carbon atoms. In some embodiments, the side chain can also comprise at least one carbon-carbon double bond. In other embodiments, the aliphatic carboxylic acid anhydride can include compounds such as those having a structure according to (I);

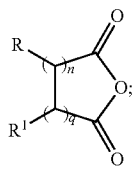

(I)

wherein each R is independently selected from the group consisting of a linear alkyl or alkenyl group having in the range of from 6 to 20 carbon atoms or a branched alkyl or alkenyl group having in the range of from 6 to 20 carbon atoms; each $R^1$ is independently selected from the group consisting of hydrogen, a linear alkyl or alkenyl group having in the range of from 6 to 20 carbon atoms, or a branched alkyl or alkenyl group having in the range of from 6 to 20 carbon atoms; or wherein R and $R^1$ may be taken together to form a ring having in the range of from 5 to 6 carbon atoms wherein the ring may optionally be substituted with a linear or branched alkyl group having in the range of from 1 to 18 carbon atoms or a linear or branched alkenyl group having in the range of from 2 to 18 carbon atoms; n is in the range of from 1 to 2; and q is in the range of from 1 to 2. Combinations of any of the aliphatic carboxylic acid anhydrides can also be used. Suitable aliphatic carboxylic acid anhydrides can include, for example, methylhexahydrophthalic anhydride, dodecylsuccinic anhydride, octylsuccinic anhydride, hexadecenylsuccinic anhydride, octenylsuccinic anhydride, octadecenylsuccinic anhydride, tetradecenylsuccinic anhydride, dodecenylsuccinic anhydride or a combination thereof. In other embodiments, the aliphatic carboxylic acid anhydrides include for example, dodecenylsuccunic anhydride, octadecenylsuccinic anhydride or a combination thereof.

The anticrater agent can be formed from a monomer mixture that includes a monofunctional epoxy compound. In some embodiments, the monofunctional epoxy can be a monofunctional epoxy ester, for example, the glycidyl ester of a carboxylic acid or an epoxy ether. In still further embodiments, the monofunctional epoxy ester can be the glycidyl ester of a carboxylic acid wherein the carboxylic acid has a structure according to (II);

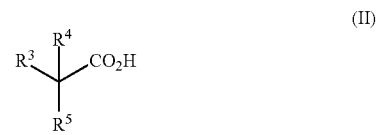

(II)

wherein each $R^3$, $R^4$ and $R^5$ is independently selected from the group consisting of a linear alkyl groups having in the range of from 1 to 12 carbon atoms, a branched alkyl group having in the range of from 3 to 12 carbon atoms, a cycloaliphatic alkyl group having in the range of from 5 to 8 carbon atoms or a combination thereof. In some embodiments, the total number of carbon atoms in the combination of $R^3$, $R^4$ and $R^5$ can be in the range of from 4 to 20. In other embodiments, the total number of carbon atoms in the combination of $R^3$, $R^4$ and $R^5$ can be in the range of from 7 to 12. Suitable examples of the monofunctional epoxy ester can include for example, the glycidyl esters of pivalic acid, 2,2-dimethyl butyric acid, neodecanoic acid, VERSATIC® acid or a combination thereof.

Other monofunctional epoxy compounds which can be used include, for example, glycidyl ethers of monohydric alcohols wherein the alcohols contain in the range of from 4 to 20 carbon atoms or glycidyl ethers of aromatic monohydric alcohols. Representative examples of glycidyl ethers can include, for example, o-cresyl glycidyl ether, phenyl glycidyl ether, butyl glycidyl ether, octyl glycidyl ether, dodecyl glycidyl ether, glycidoxypropyltrimethoxysilane, glycidoxypropyltriethoxysilane, 2-ethylhexyl glycidyl ether or a combination thereof.

The anticrater agent can be formed from a monomer mixture that includes a monofunctional alcohol. In some embodiments, the monofunctional alcohols can include alcohols containing linear, branched, cycloaliphatic alkyl groups or a combination thereof. In further embodiments, the monofunctional alcohols can contain in the range of from 4 to 12 carbon atoms and can be a linear, branched or cycloaliphatic alcohol. In still further embodiments, the monofunctional alcohols can include, for example, hexanol, 2-methyl butanol, 2-ethylhexanol, cyclohexyl methanol, methyl cyclohexanol, cyclohexanol, octanol or a combination thereof.

In some embodiments, the anticrater agent can be produced by first forming a polyester polyol. The polyester polyol can be produced by contacting an aliphatic acid anhydride, a monofunctional epoxy compound, a monofunctional alcohol and optionally, a catalyst at a temperature in the range of from 50° C. to 250° C. for a time period ranging from 10 minutes to 24 hours. A solvent can be used or the formation of the polyester polyol can be performed without the use of a solvent. In some embodiments, the monomer mixture can be heated until the acid number of the polyester polyol is as low as possible, for example, less than 10 mg KOH/g. In other embodiments, the monomer mixture can be heated until the acid number of the polyester polyol is less than 5 mg KOH/g, and in still further embodiments, until the acid number of the polyester polyol is less than 1 mg KOH/g. In some embodiments, the monomer mixture can be heated until the weight per epoxy group of the polyester polyol is as high as possible, for example greater than 15,000 Daltons. In other embodiments, the monomer mixture is heated until the weight per epoxy group of the polyester polyol is greater than 17,000 Daltons, and in still further embodiments, until the weight per epoxy group of the polyester polyol is greater than 18,000 Daltons. The optional catalyst can include, for example, triarylphosphines, triphenylphosphine, alkyltriarylphosphonium halides, ethyltriphenylphosphonium halide, alkyltriarylphosphonium esters, ethyltriphenylphosphonium acetate, ethyltriphenylphosphonium diacetate, tetraalkylphosphonium halide or a combination thereof.

In some embodiments, the polyester polyol can be reacted with a diisocyanate, a polyisocyanate or a combination thereof to form the desired polyesterurethane anticrater agent. Typical examples of diisocyanates and/or polyisocyanates can include, for example, 1,6-hexamethylene diisocyanate, isophorone diisocyanate, 2,4-toluene diisocyanate, diphenylmethane diisocyanate, diphenylmethane-4,4'-diisocyanate, dicyclohexylmethane-4,4'-diisocyanate, tetramethylxylylene diisocyanate, isocyanurates, allophonates, biurets, uretidiones of 1,6-hexamethylene diisocyanate, isocyanurates, allophonates, biurets, uretidiones of isophorone diisocyanate, isocyanurates, allophonates, biurets, uretidiones of diphenylmethane diisocyanate, isocyanurates, allophonates, biurets, uretidiones of diphenylmethane-4,4'-diisocyanate, isocyanurates, allophonates, biurets, uretidiones of dicyclohexylmethane-4,4'-diisocyanate, allophonates, biurets, uretidiones of tetramethylxylylene diisocyanate or a combination thereof.

Other polyisocyanate compounds can also be used. Suitable examples can include those that can be formed by contacting any of the forgoing isocyanates with a polyol, optionally in the presence of a urethane forming catalyst. Polyols such as, for example, pentaerythritol, polyoxypropylene ethers of glycerol, trimethylolpropane, 1,2,6-hexanetriol, sorbitol can be used. One useful adduct can be, for example, the reaction product of tetramethylxylylene diisocyanate and trimethylolpropane. In some embodiments, aromatic isocyanates are used, and in other embodiments, aliphatic or cycloaliphatic isocyanate can be used. In general, aromatic isocyanates tend to provide better emulsion stability, electrocoat appearance and corrosion resistance. In some embodiments, the isocyanate compound can be a combination of diisocyanates and polyisocyanates based on diphenylmethane diisocyanate, such as MONDUR® MR isocyanate commercially available from Bayer MaterialScience.

The polyester polyol can be contacted with diisocyanate and/or polyisocyanate at a temperature in the range of from 0° C. to 150° C., optionally in the presence of a catalyst and/or organic solvent for 10 minutes to 24 hours to give the desired polyesterurethane anticrater agent. In some embodiments, an excess of hydroxyl groups of the polyester polyol for every isocyanate group of the diisocyanate or polyisocyanate can be used and the completion of the reaction can be measured by the disappearance of the isocyanate peak as measured by infrared radiation. In some embodiments, a catalyst can be used during the formation of the polyesterurethane. Suitable catalysts can include for example, dialkyl tin dicarboxylates, dibutyl tin dilaurate, dibutyl tin diacetate, tin oxide or a combination thereof. The viscosity of the polyesterurethane can be adjusted by adding or removing organic solvent as needed.

The anticrater additive can be used with cathodic electrocoating compositions that are typically used in the automotive industry. Such electrocoating compositions comprise an aqueous emulsion having film forming binders dispersed therein. The film forming binders can comprise any of the known electrocoating crosslinkable components and crosslinking agents. In some embodiments, the crosslinkable component comprises or consists essentially of an epoxy amine adduct and the crosslinking agent comprises or consists essentially of blocked polyisocyanates.

To disperse the non-water reducible anticrater agent in the electrocoating composition, the anticrater agent can be combined with the crosslinkable component and the crosslinking agent and mixed. In some embodiments, the anticrater agent can be used in an amount in the range of from 0.5 to 10 percent by weight, based on the weight of the crosslinkable component and the crosslinking agent. In other embodiments, the anticrater agent can be used in an amount in the range of from 1 to 5 percent by weight, based on the weight of the crosslinkable component and the crosslinking agent. In some embodiments, the anticrater agent can be used in an amount in the range of from 0.5 to 10 percent by weight, based on the weight of the epoxy amine adduct and the blocked polyisocyanate crosslinking agent. In still further embodiments, the anticrater agent can be used in an amount in the range of from 1 to 5 percent by weight, based on the weight of the epoxy amine adduct and the blocked polyisocyanate crosslinking agent.

After mixing the anticrater agent with the epoxy amine adduct and the crosslinking agent, an aqueous acid can be added. The aqueous acid forms an ammonium salt with the epoxy amine adduct, producing a water soluble or water dispersible mixture which is known as the principal emulsion. While not wishing to be bound by theory, it is thought that the acid of the aqueous acid used to form the principal emulsion is a stronger acid than any remaining acid groups of the polyesterurethane anticrater agent. If any acid functional groups remain on the polyesterurethane anticrater agent, and those acid groups form a salt with the epoxy amine adduct, it is believed that the acid groups of the aqueous acid would then displace them regenerating the original polyesterurethane anticrater agent with free acid groups.

The principal emulsion can then be combined with known pigment pastes, coalescing solvents and other additives that are common in the art to form the electrocoating composition. The electrocoating composition is placed in an insulated tank containing the anode. The object to be coated is made the cathode and is passed through the tank containing the electrocoating composition. The thickness of the coating is a function of the bath characteristics, the electrical operating characteristics, the immersion time, and so forth. After coating, the object is removed from the bath and can be rinsed with deionized water. The applied coating can then be cured in an oven at sufficient temperature to produce crosslinking. Usually the cured electrocoat composition is overcoated with any of a variety of different topcoat systems (e.g. basecoat/clearcoat) as is known in the art.

Another embodiment of the present disclosure is a substrate that is coated with a dried and cured layer of the improved electrocoating composition. In these embodiments, a substrate is coated with a layer of the electrocoating composition comprising the anticrater additive and the applied layer is dried and cured to produce a crosslinked coating on a substrate. The step of curing can take place in a curing oven at a temperature in the range of from 150° C. to 190° C. for 10 to 60 minutes. The cured coating layer can have a dry film thickness in the range of from 10 micrometers to 30 micrometers.

Suitable substrates can include any electrically conductive material, especially those for an automobile vehicle or body. Non-conductive substrates that have been made electrically conductive by the addition of a conductive coating can also be coated.

EXAMPLES

The following examples are used to illustrate certain embodiments of the disclosure.

The following abbreviations/ingredients are used in the examples. Unless otherwise stated, all ingredients are available from the Aldrich Chemical Company, Milwaukee, Wis.

DDSA means dodecenyl succinic anhydride.

CARDURA® E-10P ester is available from Hexion Specialty Chemicals, Columbus, Ohio.

MONDUR® MR isocyanate is available from Bayer Material Science, Pittsburgh, Pa.

DBTDL is dibutyl tin dilaurate.

MIBK is methyl isobutyl ketone.

EPON® 828 epoxy resin is available from Hexion Specialty Chemicals, Inc., Columbus, Ohio.

SYNFAC® 8009 alkoxylate is available from Milliken Chemical, Spartanburg, S.C.

Preparation of Anticrater Agent 1

TABLE 1

| Ingredient | Amount (grams) |
|---|---|
| Portion 1 | |
| DDSA | 266.00 |
| 2-ethylhexanol | 130.00 |
| CARDURA ® E-10P | 244.00 |
| 33% triphenylphosphine in xylene | 4.85 |
| Portion 2 | |
| DDSA | 266.00 |
| CARDURA ® E-10P | 244.00 |
| 33% triphenylphosphine in xylene | 7.00 |
| Portion 3 | |
| MONDUR ® MR | 128.04 |
| DBTDL | 2.24 |
| Portion 4 | |
| MIBK | 310.31 |

The ingredients of portion 1 in Table 1 were charged to a reactor with stirring under a nitrogen blanket. The mixture was heated to 115° C. and was allowed to exotherm freely, but not to exceed a temperature of 210° C. After the exotherm had peaked, the temperature of the mixture was held at 132° C. for one hour. The acid number of the reaction mixture was less than 8 g KOH/g resin and the weight per epoxy group was greater than 18,000. The ingredients of portion 2 was then added to the mixture and the temperature was held at 132° C. for two hours. The acid number of the reaction mixture was less than 8 g KOH/g resin and the weight per epoxy was greater than 18,000. The ingredients of portion 3 were then added to the reaction mixture and the temperature was held at 121° C. until disappearance of the isocyanate peak as determined by infrared. The heating source was removed and portion 4 was added to the mixture. The anticrater agent had a solids content of about 80% and a Gardner-Holdt viscosity of U-X.

Preparation of Crosslinking Agent

A blocked polyisocyanate crosslinking agent was prepared by charging 317.14 parts MONDUR® MR polyisocyanate, 105.71 parts MIBK and 0.06 parts dibutyl tin dilaurate into a suitable reaction vessel and heating the mixture to 37° C. under a nitrogen blanket. A mixture of 189.20 parts propylene glycol mono methyl ether and 13.24 parts trimethylolpropane was slowly charged into the reaction vessel while maintaining the reaction mixture below 93° C. The reaction mixture was then held at 110° C. until essentially all of the isocyanate was reacted as indicated by infrared analysis. The mixture was cooled to room temperature and a mixture of 3.17 parts butanol and 64.33 parts methyl isobutyl ketone was added. The resulting blocked polyisocyanate crosslinking solution had a nonvolatile content of 75%.

Preparation of Polyepoxide Emulsion

This preparation describes the formation of a polyepoxide emulsion containing the non-water reducible anticrater agent of the disclosure. The following ingredients were charged into a suitable reaction vessel: 489 parts EPON® 828, 199 parts bisphenol A, 21 parts xylene and 0.5 parts triphenylphosphonium iodide. The resulting reaction mixture was heated to 160° C. under nitrogen blanket and held at this temperature until epoxy equivalent weight of 800 was obtained. 148 parts of SYNFAC® 8009 was then added to the mixture. The reaction mixture was cooled to 149° C. and then 711 parts of the Crosslinking Agent was added. The mixture was cooled to 107° C. and 63 parts of diketimine (reaction product of diethylenetriamine and methyl isobutyl ketone at 73% nonvolatile) and 50 parts of methyl ethanol amine were added. The resulting mixture was heated to 120° C. and the temperature was held for one hour. 56 parts of Anticrater Agent 1 was added and mixed for 30 minutes. The mixture was then dispersed in an aqueous medium of 1693 parts deionized water and 68 parts aqueous lactic acid (88% lactic acid in deionized water). The mixture was then further diluted with 974 parts deionized water. The emulsion was agitated until methyl isobutyl ketone had evaporated. The resulting emulsion had a nonvolatile content of 38%.

Preparation of Comparative Polyepoxide Emulsion

This preparation describes the formation of a polyepoxide emulsion that does not contain the disclosed non-water reducible anticrater agent. The following ingredients were charged into a suitable reaction vessel: 489 parts EPON® 828, 199 parts bisphenol A, 21 parts xylene and 0.5 parts tripheylphosphonium iodide. The resulting reaction mixture was heated to 160° C. under nitrogen blanket and held at this temperature until epoxy equivalent weight of 800 was obtained. 148 parts of SYNFAC® 8009 was then added to the mixture. The reaction mixture was cooled to 149° C. and then 711 parts of Crosslinking Agent 1 was added. The mixture was cooled to 107° C. and 63 parts of diketimine (reaction product of diethylenetriamine and methyl isobutyl ketone at 73% nonvolatile) and 50 parts of methyl ethanol amine were added. The resulting mixture was heated to 120° C. and the temperature was held for one hour. The mixture was dispersed in an aqueous medium of 1693 parts deionized water and 68 parts aqueous lactic acid (88% lactic acid in deionized water). It was further diluted with 974 parts deionized water. The emulsion was agitated until methyl isobutyl ketone had evaporated. The resulting emulsion had a nonvolatile content of 38%.

Preparation of Quaternizing Agent

A quaternizing agent was prepared by adding 87 parts dimethylethanolamine to 320 parts 2-ethyl hexanol half-capped toluene diisocyanate in the reaction vessel at room temperature. The reaction was exothermic and was stirred for one hour at 80° C. 118 parts aqueous lactic acid solution (75% nonvolatile content) was then added followed by the addition of 39 parts 2-butoxyethanol. The reaction mixture was held for one hour at 65° C. with constant stirring to form the quaternizing agent.

Preparation of Pigment Grinding Vehicle

The pigment grinding vehicle was prepared by charging 710 parts EPON® 828 and 290 parts bisphenol A into a suitable vessel under nitrogen blanket and the mixture was heated to 150° C. to 160° C. to initiate an exothermic reaction. The temperature of the mixture was maintained at between 150° C. and 160° C. for one hour. The reaction mixture was then cooled to 120° C. and 496 parts of 2-ethyl hexanol half-capped toluene diisocyanate was added. The temperature of the reaction mixture was held at 110° C. to 120° C. for one hour, followed by the addition of 1095 parts of 2-butoxyethanol, and the reaction mixture was then cooled to 85° C. to 90° C. and 71 parts of deionized water was added followed by the addition of 496 parts the Quaternizing Agent (prepared above). The temperature of the reaction mixture was held at 85° C. to 90° C. until an acid value of about 1 mg KOH/g was obtained.

Preparation of Pigment Paste

The ingredients of Table 2 were combined in a suitable mixing container and mixed until homogeneous mixture was formed. The mixture was then dispersed by charging into Eiger mill and grinding until it pass the Hegman test.

TABLE 2

| Ingredient | Parts by Weight |
| --- | --- |
| Pigment Grinding Vehicle | 597.29 |
| Deionized Water | 1140.97 |
| Titanium Dioxide Pigment | 419.28 |
| Aluminum Silicate Pigment | 246.81 |
| Carbon Black Pigment | 15.27 |
| Barium Sulfate Pigment | 416.38 |
| Dibutyl Tin Oxide | 164.00 |

Preparation of Electrocoat Composition 1 and Comparative Electrocoat Compositions A, B and C.

The ingredients of each of the compositions of TABLE 3 were mixed in suitable mixing vessels until homogenous mixtures were formed. The mixtures were then dispersed by charging into an Eiger Mill and grinding until the dispersions passed the Hegman test.

TABLE 3

| Ingredient | Electrocoat Composition 1 | Comparative Electrocoat Composition A | B | C |
| --- | --- | --- | --- | --- |
| Polyepoxide Emulsion 1 | 1665 | 0 | 0 | 0 |
| Comparative Polyepoxide Emulsion | 0 | 1665 | 1582 | 1582 |
| Deionized Water | 2000 | 2000 | 1993 | 1978 |
| Pigment Paste | 335 | 335 | 335 | 335 |
| Comparative Anticrater Agent 1[1] | 0 | 0 | 90 | 0 |
| Comparative Anticrater Agent 2[2] | 0 | 0 | 0 | 105 |

[1]Reaction product of JEFFAMINE® D2000 and EPON® 1001 Epoxy resin, emulsified in deionized water at 35% nonvolatile.
[2]Comparative Anticrater Agent 2 was produced according to the procedure of Anticrater Additive 1, shown in U.S. Pat. No. 7,264,705 at column 8 lines 5 to 26.

The Electrocoating compositions were ultrafiltered. Phosphated cold rolled steel panels were electrocoated using the electrocoat compositions at voltage in the range of from 240 to 280 volts and then baked at 182° C. (metal temperature) for 10 minutes. The resulting layer of electrocoat compositions had dry film builds in the range of from 20 to 23 micrometers.

Each of the coated panels was then evaluated for surface roughness using a Taylor-Hobson SURTRONIC 3+ profilometer, ASPP blowout crater, Oil contamination test and PVC sealer Adhesion. The results of these tests are shown in Table 4

To perform the oil contamination test, 20 parts per million of Quaker Oil was added to the Electrocoating Compositions and mixed for 24 hours under low agitation. The oil contaminated Electrocoating compositions were then used to coat phosphated cold rolled steel panels in the same manner as was previously done.

PVC adhesion testing was performed by baking the electrocoated panels using an electric element oven. Thereafter, a bead of PVC sealer approximately 1 millimeter thick was applied to the panel and was baked in a 140° C. oven for 10 minutes. The adhesion of the sealer was rated to pass the test if no sealer could be pulled from the panel and fail if the sealer could be pulled off of the panel.

TABLE 4

| Test | Electrocoat Composition 1 | Comparative Electrocoat Composition A | B | C |
| --- | --- | --- | --- | --- |
| Surface Roughness | 8 µin | 13 µin | 11 µin | 10 µin |
| ASPP Blowout Crater | 0 to 10% defect | greater than 80% defect | 41 to 80% defect | 11 to 20% defect |
| Oil Contamination | less than 10 craters | greater than 100 craters | 30 to 50 craters | 10 to 20 craters |
| PVC Sealer Adhesion | pass | pass | fail | pass |

What is claimed is:

1. An improved cathodic electrocoating composition, comprising an aqueous emulsion having dispersed therein a crosslinkable component and a crosslinking agent; wherein the improvement is the incorporation of a non-water reducible anticrater agent comprising a polyesterurethane which is the reaction product of a monomer mixture consisting essentially of:
    (1) a polyol produced by contacting:
        (a) a cyclic aliphatic carboxylic acid anhydride;
        (b) a monofunctional epoxy compound; and
        (c) a monofunctional alcohol; wherein the polyester polyol has an acid number of less than 10 mg KOH/g; and
    (2) a diisocyanate, polyisocyanate or a combination thereof;

wherein the cyclic aliphatic carboxylic acid anhydride contains one or more side chains selected from the group consisting of an alkyl side chain having in the range of from 6 to 20 carbon atoms, an alkenyl side chain having in the range of from 6 to 20 carbon atoms and a combination thereof, and wherein the anticrater agent has a solubility in water of less than 0.5 grams/liter.

2. The composition of claim 1, wherein the aliphatic carboxylic acid anhydride has a structure according to formula (I);

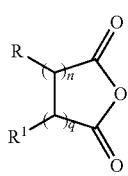

wherein each R is independently selected from the group consisting of a linear alkyl or alkenyl group having in the range of from 6 to 20 carbon atoms or a branched alkyl or alkenyl group having in the range of from 6 to 20 carbon atoms; each $R^1$ is independently selected from the group consisting of hydrogen, a linear alkyl or alkenyl group having in the range of from 6 to 20 carbon atoms, or a branched alkyl or alkenyl group having in the range of from 6 to 20 carbon atoms; or wherein R and $R^1$ may be taken together to form a ring having in the range of from 5 to 6 carbon atoms wherein the ring may optionally be substituted with a linear or branched alkyl group having in the range of from 1 to 18 carbon atoms or a linear or branched alkenyl group having in the range of from 2 to 18 carbon atoms; n is in the range of from 1 to 2; and q is in the range of from 1 to 2.

3. The composition of claim 1 wherein the monofunctional alcohol contains in the range of from 4 to 12 carbon atoms and is a linear, branched or cycloaliphatic alcohol.

4. The composition of claim 3 wherein the monofunctional alcohol is chosen from the group consisting of hexanol, 2-methyl butanol, 2-ethylhexanol, cyclohexyl methanol, methyl cyclohexanol, cyclohexanol, octanol and a combination thereof.

5. The composition of claim 1 wherein the monofunctional epoxy is an epoxy ester or an epoxy ether.

6. The composition of claim 5 wherein the monofunctional epoxy compound is the glycidyl ester of a carboxylic acid wherein the carboxylic acid has a structure according to formula (II);

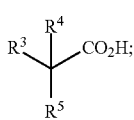

wherein each $R^3$, $R^4$ and $R^5$ is independently selected from the group consisting of a linear alkyl group having in the range of from 1 to 12 carbon atoms, a branched alkyl group having in the range of from 3 to 12 carbon atoms, a cycloaliphatic alkyl group having in the range of from 5 to 8 carbon atoms or a combination thereof.

7. The composition of claim 1 wherein the diisocyanate and/or polyisocyanate is selected from the group consisting of 1,6-hexamethylene diisocyanate, isophorone diisocyanate, 2,4-toluene diisocyanate, diphenylmethane diisocyanate, diphenylmethane-4,4'-diisocyanate, dicyclohexylmethane-4,4'-diisocyanate, tetramethylxylylene diisocyanate, isocyanurates, allophonates, biurets, uretidiones of 1,6-hexamethylene diisocyanate, isocyanurates, allophonates, biurets, uretidiones of isophorone diisocyanate, isocyanurates, allophonates, biurets, uretidiones of diphenylmethane diisocyanate, isocyanurates, allophonates, biurets, uretidiones of diphenylmethane-4,4'-diisocyanate, isocyanurates, allophonates, biurets, uretidiones of dicyclohexylmethane-4,4'diisocyanate, allophonates, biurets, uretidiones of tetramethylxylylene diisocyanate or a combination thereof.

8. The composition of claim 1 wherein the cathodic electrocoat composition contains in the range of from 0.5 to 10 percent by weight of the anticrater agent, wherein the weight percentage is based on the amount of crosslinkable component and the crosslinking agent.

9. The composition of claim 8 wherein the crosslinkable component is an epoxy amine adduct and the crosslinking agent is a blocked polyisocyanate.

10. An improved cathodic electrocoating composition, comprising an aqueous emulsion having dispersed therein a crosslinkable component and a crosslinking agent; wherein the improvement is the incorporation of a non-water reducible anticrater agent comprising a polyesterurethane which is the reaction product of a monomer mixture consisting of:
 (1) a polyester polyol produced by contacting:
  (a) a cyclic aliphatic carboxylic acid anhydride;
  (b) a monofunctional epoxy compound;
  (c) a monofunctional alcohol; and
  (d) a catalyst, wherein the polyester polyol has an acid number of less than 10 mg KOH/g;
 (2) a diisocyanate; and
 (3) a solvent;
 wherein the cyclic aliphatic carboxylic acid anhydride contains one or more side chains selected from the group consisting of an alkyl side chain having in the range of from 6 to 20 carbon atoms, an alkenyl side chain having in the range of from 6 to 20 carbon atoms and a combination thereof, and wherein the anticrater agent has a solubility in water of less than 0.5 grams/liter.

11. An improved cathodic electrocoating composition, comprising an aqueous emulsion having dispersed therein a crosslinkable component and a crosslinking agent; wherein the improvement is the incorporation of a non-water reducible anticrater agent comprising a polyesterurethane produced by:
 contacting a cyclic aliphatic carboxylic acid anhydride; a monofunctional epoxy compound; and a monofunctional alcohol to produce a polyester polyol;
 heating the polyester polyol until the polyester polyol has an acid number of less than 10 mg KOH/g; and
 reacting the polyester polyol with a combination of a diisocyanate and a polyisocyanate;
 wherein the cyclic aliphatic carboxylic acid anhydride contains one or more side chains selected from the group consisting of an alkyl side chain having in the range of from 6 to 20 carbon atoms, an alkenyl side chain having in the range of from 6 to 20 carbon atoms and a combination thereof, and wherein the anticrater agent has a solubility in water of less than 0.5 grams/liter.

12. The composition of claim 1, wherein the anticrater agent has a solubility in water of less than 0.1 grams/liter.

13. The composition of claim 10, wherein the anticrater agent has a solubility in water of less than 0.1 grams/liter.

14. The composition of claim 11, wherein the anticrater agent has a solubility in water of less than 0.1 grams/liter.

15. The composition of claim 1, wherein the polyester polyol has an acid number of less than 5 mg KOH/g.

16. The composition of claim 1, wherein the polyester polyol has an acid number of less than 1 mg KOH/g.

17. The composition of claim 1, wherein the polyester polyol has a weight per epoxy group of greater than 15,000 Daltons.

18. The composition of claim 1, wherein the polyester polyol has a weight per epoxy group of greater than 17,000 Daltons.

19. The composition of claim 1, wherein the polyester polyol has a weight per epoxy group of greater than 18,000 Daltons.

20. The composition of claim 11, wherein heating the polyester polyol comprises heating the polyester polyol until the polyester polyol has a weight per epoxy group of greater than 15,000 Daltons.

* * * * *